US012645328B2

(12) United States Patent
Kang et al.

(10) Patent No.: US 12,645,328 B2
(45) Date of Patent: Jun. 2, 2026

(54) TOUCH DISPLAY DEVICE AND DRIVER CIRCUIT

(71) Applicant: NOVATEK Microelectronics Corp., Hsinchu (TW)

(72) Inventors: Chun-Wei Kang, Hsinchu City (TW); Yen-Cheng Cheng, Hsinchu City (TW); Chien-Hung Lin, Hsinchu County (TW); Jhuang-Yu Cyue, Hsinchu County (TW); Sheng-Huang Chu, Miaoli County (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 18/786,589

(22) Filed: Jul. 29, 2024

(65) Prior Publication Data
US 2025/0244846 A1 Jul. 31, 2025

(30) Foreign Application Priority Data
Jan. 26, 2024 (TW) ................................. 113103215

(51) Int. Cl.
*G06F 3/041* (2006.01)
*G09G 3/36* (2006.01)
(52) U.S. Cl.
CPC ........ *G06F 3/04184* (2019.05); *G06F 3/0412* (2013.01); *G06F 3/0416* (2013.01); *G09G 3/3648* (2013.01); *G09G 2354/00* (2013.01)
(58) Field of Classification Search
CPC .. G06F 3/0412; G06F 3/0416; G06F 3/04184; G09G 3/3648; G09G 2354/00
See application file for complete search history.

(56) References Cited

U.S. PATENT DOCUMENTS

2013/0271420 A1* 10/2013 Chen ..................... G06F 3/0446
345/174
2013/0307817 A1 11/2013 Kim
2014/0078097 A1* 3/2014 Shepelev .............. G06F 3/0446
345/174

(Continued)

FOREIGN PATENT DOCUMENTS

TW 202131156 A 8/2021

OTHER PUBLICATIONS

Jae-Hun Jun et al., "In-Cell Self-Capacitive-Type Mobile Touch System and Embedded Readout Circuit in Display Driver IC", Journal of Display Technology, vol. 12, No. 12, Dec. 2016, pp. 1613-1622.

*Primary Examiner* — Ryan A Lubit
(74) *Attorney, Agent, or Firm* — CKC & Partners Co., LLC

(57) ABSTRACT

A touch display device is provided. The touch display device includes a touch display panel and a driver circuit. The touch display panel includes a control transistor coupled to a common electrode through a liquid crystal capacitor. The driver circuit is coupled to the touch display panel, and outputs a first driving signal to a first terminal of the control transistor. When the touch display panel switches from a first operational cycle to a first transition interval, the driver circuit adjusts the first driving signal to change a voltage of the first terminal of the transistor from a first voltage to a second voltage different from the first voltage to adjust a voltage of the common electrode.

17 Claims, 10 Drawing Sheets

(56)  References Cited

U.S. PATENT DOCUMENTS

| | | | |
|---|---|---|---|
| 2015/0116266 A1* | 4/2015 | Inoue | G06F 3/0445 |
| | | | 345/174 |
| 2016/0147283 A1* | 5/2016 | Cho | G06F 3/0412 |
| | | | 345/173 |
| 2017/0344145 A1* | 11/2017 | Lo | G06F 3/0443 |
| 2018/0024677 A1* | 1/2018 | Kim | G06F 3/0412 |
| | | | 345/173 |
| 2018/0335888 A1* | 11/2018 | Endo | G06F 3/04166 |
| 2022/0057872 A1* | 2/2022 | Fujisawa | G06F 3/044 |
| 2022/0187943 A1* | 6/2022 | Lee | G06F 3/0443 |
| 2022/0197474 A1* | 6/2022 | Kang | G06F 3/04166 |

\* cited by examiner

TOUCH DISPLAY DEVICE AND DRIVER CIRCUIT

RELATED APPLICATIONS

This application claims priority to Taiwanese Application Serial Number 113103215, filed Jan. 26, 2024, which is herein incorporated by reference.

BACKGROUND

Field of Invention

The disclosure relates to display technology. More particularly, the disclosure relates to a touch display device and a driver circuit.

Description of Related Art

A touch display panel can be controlled by integrating the touch function and the driver circuit of the display panel into a single chip. This integration can be applied to tablets, cell phones, wearable devices, etc., to provide a more integrated and highly interactive user experience.

SUMMARY

The disclosure provides a touch display device, including a touch display panel and a driver circuit. The touch display panel includes a control transistor coupled to a common electrode through a liquid crystal capacitor. The driver circuit is coupled to the touch display panel, and outputs a first driving signal to a first terminal of the control transistor. When the touch display panel switches from a first operational cycle to a first transition interval, the driver circuit adjusts the first driving signal to change a voltage of the first terminal of the transistor from a first voltage to a second voltage different from the first voltage to adjust a voltage of the common electrode.

The disclosure provides a driver circuit for driving a touch display panel, including a control circuit and a first driver circuit. The control circuit generates a control signal based on a display data voltage for a display cycle and a preset voltage for a touch sensing cycle. The first driver circuit is coupled to the control circuit and outputs, in response to the control signal, a first driving signal having a first voltage in a first transition interval between the display cycle and the touch sensing cycle. The first voltage is different from a second voltage of the first driving signal in the display cycle.

It is to be understood that both the foregoing general description and the following detailed description are demonstrated by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
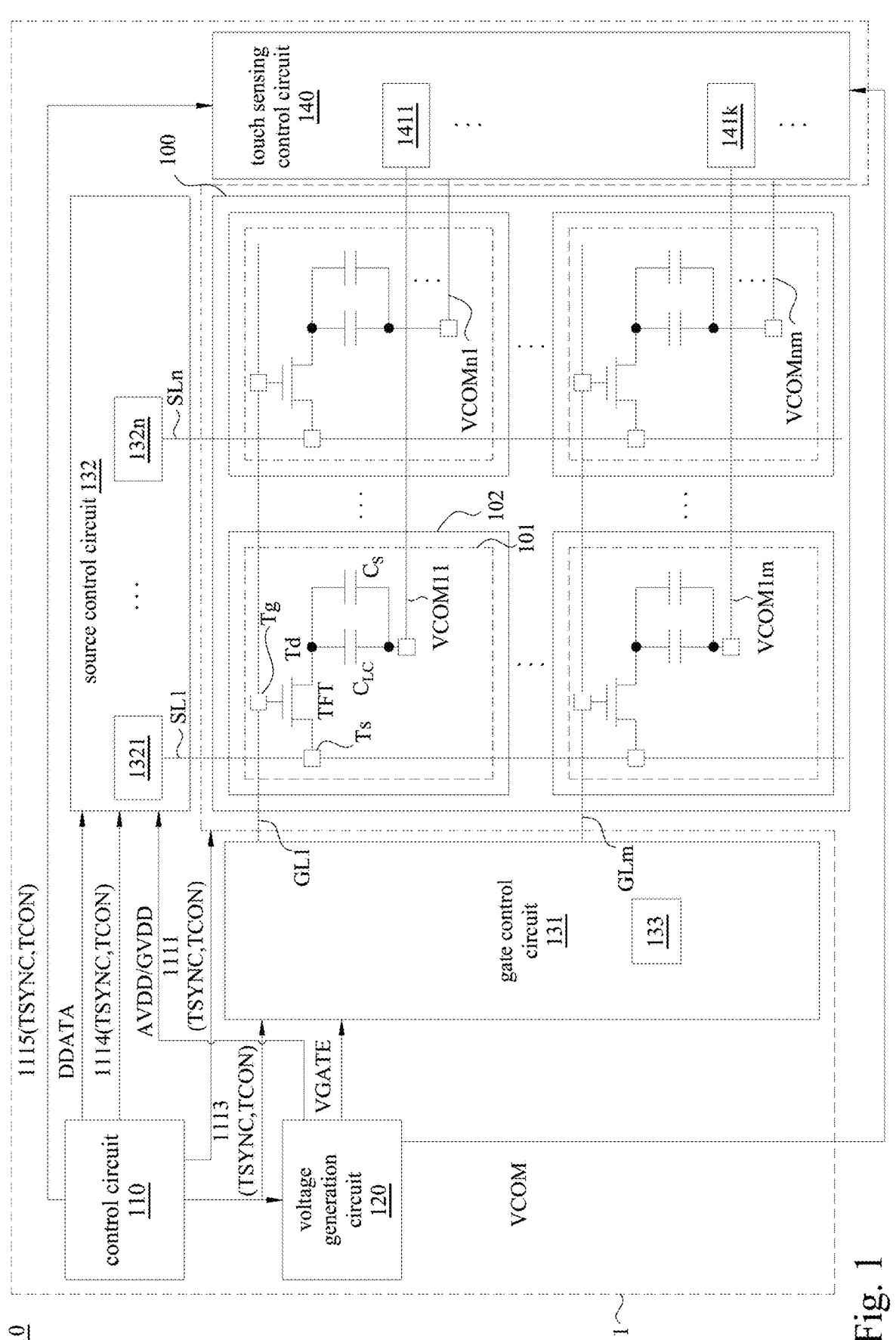
FIG. 1 is a schematic of a touch display device, in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is now made to FIG. 1. FIG. 1 is a schematic of a touch display device 10, in accordance with some embodiments of the present disclosure. As shown in the figure, the touch display device 10 includes a touch display panel 100 and a driver circuit 11 composed of multiple circuits. The driver circuit 11 is configured to drive the touch display panel 100. In some embodiments, the driver circuit 11 includes a control circuit 110, a voltage generation circuit 120, a gate control circuit 131, a source control circuit 132, and a touch sensing control circuit 140. The control circuit 110 is configured to output the control signal 1111-1115 separately to the touch display panel 100, the voltage generation circuit 120, the gate control circuit 131, the source control circuit 132 and the touch sensing control circuit 140 to control the display operation and touch sensing operation of the touch display panel 100 through these circuits.

In an embodiment, the driver circuit 11 may be implemented by one or more integrated circuits. In another embodiment, the control circuit 110, the voltage generation circuit 120, the source control circuit 132, and the touch sensing control circuit 140 may be integrated into a touch display integrated chip, and the gate control circuit 131 is a gate on array circuit on the touch display panel 100. The gate control circuit 131 receives the control signal 1113 from the control circuit 110, and successively conducts the gate lines GL1-GLm on the touch display panel 100.

In some embodiments, the touch display panel 100 further includes n source drive lines SL1 to SLn that are connected to the source control circuit 132. The touch display panel 100 includes multiple pixels 101 arranged in a column-row matrix. As shown in FIG. 1, the pixel 101 is disposed at the intersection of each gate drive line and source drive line. In some embodiments, the pixels 101 disposed at a certain row are coupled to the same one in the gate drive lines GL1 to GLm, and the pixels 101 disposed in a certain column are coupled to the same one in the source drive lines SL1 to SLn.

As shown in the embodiment in FIG. 1, each pixel 101 in the touch display panel 100 includes a control transistor TFT and a liquid crystal capacitor $C_{LC}$ coupled between the drain terminal Td of the control transistor TFT and a common electrode 102, in which a parasitic capacitance $C_S$ is formed between the common electrode 102 and the drain terminal Td of the control transistor TFT. The gate terminal Tg of the control transistor TFT is coupled to the corresponding one in the gate drive line GL1-GLm, and its source terminal Ts is coupled to the corresponding one in the source drive line SL1-SLn. The liquid crystal capacitor $C_{LC}$ is coupled with the common electrode 102. The common electrode 102 is coupled with the touch sensing control circuit 140 through the common electrode lines VCOM11-VCOMnm.

In some embodiments, multiple pixels 101 are coupled to the same common electrode 102 and connected to the touch sensing control circuit 140 through the same common electrode line. For example, the pixels 101 connected to the gate drive lines GL1-GL40 are coupled to the same common electrode 102, and are coupled to, through the common electrode line VCOM11, one of k common electrode sensing driver circuits 1411-141_k_ in the touch sensing control circuit 140; on the other hand, the pixels 101 coupled to the gate drive line GL41-GL80 are coupled to another common electrode 102, and are coupled to, through the common electrode line VCOM12, another one in the sensing driver circuit 1411-141_k_ in the touch sensing control circuit 140. In some embodiments, the numbers k, m, and n are positive integers and k is less than m. The configuration of FIG. 1, such as the number of pixels connected to the same common electrode 102, is given for illustrative purposes and is not intended to limit this disclosure.

In some embodiments, the touch display Panel 100 is implemented as an in-cell multi-touch panel that integrates the touch control elements within the display panel. The structure of the touch display panel 100 may include a lower polarized layer, a lower glass substrate, a thin film transistor layer including the control transistors TFT, transparent electrodes corresponding to gate drive lines GL1-GLm and source drive lines SL1-SLn, a liquid crystal layer corresponding to the liquid crystal capacitors $C_{LC}$, a common electrode layer corresponding to common electrodes 102 and a touch control drive layer of common electrode lines VCOM11-VCOMn connected thereto, a color filter layer, an upper glass substrate and an upper polarizer layer.

In some embodiments of operations, duration of a display frame includes a display cycle, a touch sensing cycle, and a transition interval between the two operating cycles. During the display cycle, the switches between the common electrodes 102 of the touch display device 10 are turned on in response to the control signal 1111 transmitted by the control circuit 110, so that the common electrodes 102 have a common voltage. The liquid crystal in the liquid crystal capacitor $C_{LC}$ changes along with the electric field applied between the common electrode 102 and the source terminal of the control transistor TFT to display an image corresponding to the display data voltage on the source drive line. In contrast, during the touch sensing cycle, the switches between the common electrodes 102 are turned off in response to the control signal 1111, so that the common electrodes 102 are electrically separated to configure as the touch sensing electrodes. The relevant operations of the touch display device 10 will be explained in the following paragraphs with reference to FIG. 2 to FIG. 7.

Continuing with reference to FIG. 1, in some embodiments, the control circuit 110 generates the control signals 1111-1115 based on data signals (such as color RGB data that form the image) output from an image supply source (e.g., a computer's motherboard) and information about the display and touch. In some embodiments, the control circuit 110 includes a timing control circuit for the control signals 1111-1115 to include, for example, at least one of the timing control signal TCON and the touch panel synchronization signal TSYNC, etc. In addition, the control signals 1111-1115 may also include one of the voltage control signals, gate control signals, source control signals, and touch sensing control signals to control the corresponding circuit.

The voltage generation circuit 120 generates, in response to the control signal 1112, multiple reference voltages, including the voltage VGATE applied to the gate control circuit 131 to drive a selected one of the gate drive lines GL1 to GLm, the source drive voltage AVDD applied to the source control circuit 132, the gamma reference voltage GVDD, and the common voltage VCOM that is transmitted to the touch sensing control circuit 140 in order to be applied on the touch display panel 100.

The control circuit 110 outputs the control signal 1113 to control the gate control circuit 131, and outputs the display data signal DDATA corresponding to the color RGB data and the control signal 1114 to the source control circuit 132. In some embodiments, the control circuit 110 controls the timing of the outputting data and driving signals from the source control circuit 132 and the gate control circuit 131. For example, in some embodiments of display operation, the control circuit 110 controls the gate control circuit 131 by control signals 1112 and 1113 to continuously transmit the gate driving VG having pulse to each gate drive line GL1-GLm and further to the gate terminal Tg of the control transistors TFT, changing the voltage of the gate terminal Tg to turn on the corresponding control transistor TFT. The display data voltage of the source driving signal VS on the corresponding source drive line is applied to the source terminal Ts of each pixel 101 in the selected row.

The source control circuit 132 includes multiple source driver circuits 1321-132_n_, each of which drives the corresponding one of the source drive lines SL1-SLn. For example, the source driver circuit 1321 is coupled to and outputs the source driving signal VS through the source drive line SL1 to the source terminal Ts of the control transistor TFT in pixel 101.

In some embodiments, the source control circuit 132 switches different drive modes in response to the control signal 1114 to have a different drive power during outputting the source driving signal VS. For example, the source driver circuits 1321-132n in the source control circuit 132 has a greater drive power in drive mode 1 than in drive mode 0, and so on. In some embodiments, the source driver circuits 1321-132n include operational amplifiers that are configured as drivers to provide current source to charge and discharge the output source driving signal VS. Therefore, in drive mode 1, the current output of the operational amplifier is larger than that in drive mode 0, providing greater drive capability. Relevant embodiments will be illustrated with reference to FIG. 2 to FIG. 6.

The touch sensing control circuit 140 includes multiple sensing driver circuits 1411-141k. In the touch sensing operation cycle of the touch display panel 100, the sensing driver circuit 1411-141k are configured to sense the variation of charges of the capacitor between the common electrode 102 and the corresponding gate drive line or source drive line during the charging and the discharging, and further to output the corresponding k sensing signals.

Figure 2:
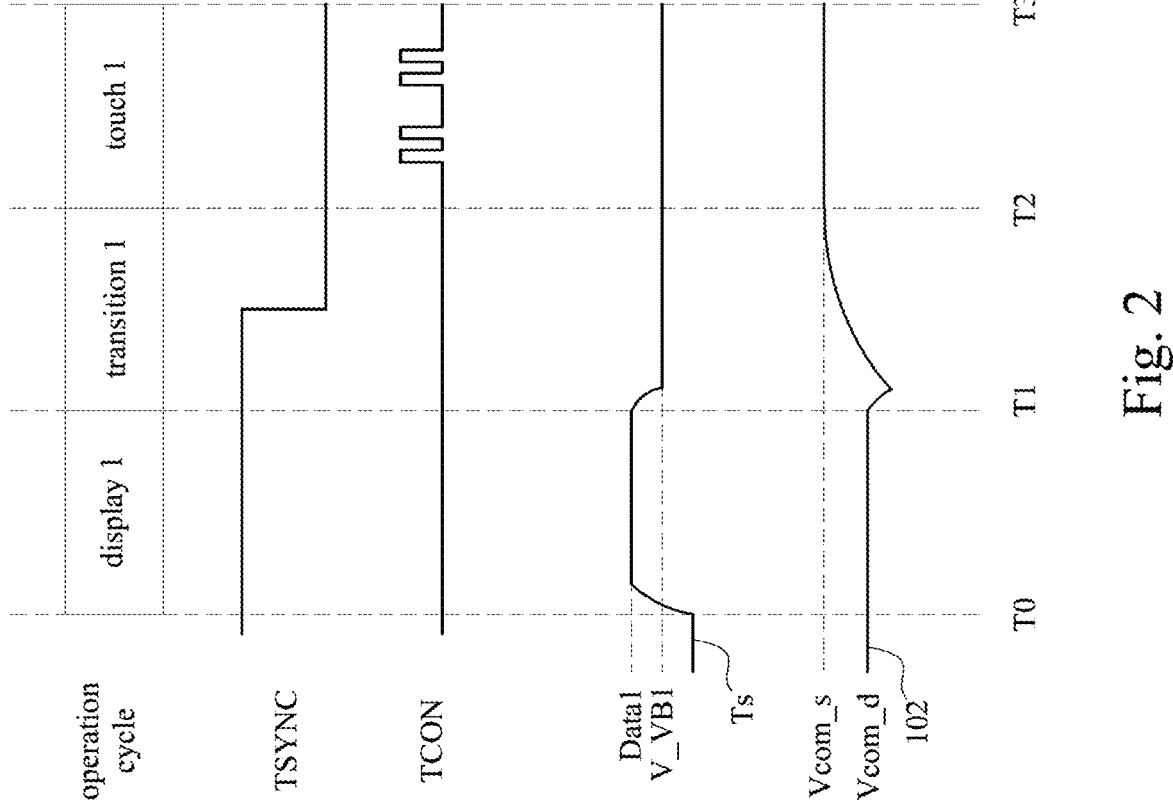
FIG. 2 illustrates waveform diagrams of a touch panel synchronization signal, a timing control signal, and a voltage change at the source terminal and the common electrode when the touch display device in FIG. 1 changes from a display cycle (display 1) to a touch period (touch 1), in accordance with some embodiments of the present disclosure.

Reference is now made to both FIG. 1 and FIG. 2. FIG. 2 illustrates waveform diagrams of the touch panel synchronization signal TSYNC, the timing control signal TCON, and the voltage changes at the source terminal Ts and common electrode 102 when the touch display device 10 in FIG. 1 changes from the display cycle (display 1) to the touch period (touch 1), in accordance with some embodiments of the present disclosure. For ease of understanding, FIG. 2 only shows the waveforms of the voltage changes of the source terminal Ts and its common electrode 102 corresponding to one pixel 101 of FIG. 1.

In some driving methods, during the transition interval between the display cycle and the touch sensing cycle, the source terminal of the control transistor remains the display data voltage for the display cycle, a high impedance state (high Z), or a relatively low power supply voltage, such as VSS. As a result, when the touch display panel switches to the touch sensing cycle, the source terminal of the control transistor is suddenly adjusted to a voltage that is used for touch sensing, resulting in a surge occurring at the common electrode configured to the sensing electrode due to the coupling between the source terminal and the common electrode. The aforementioned configuration affects the touch accuracy of the touch panel.

According to the operations of the embodiment in FIG. 2, the source driver circuit 1321 adjusts the voltage of the source terminal Ts in the transition interval (transition 1) between the display cycle (display 1) and the touch sensing cycle (touch 1), so that the surge wave coupled to the common electrode 102 due to the voltage change of the source terminal Ts appears earlier in the transition interval. In this way, the aforementioned surge will not interfere with the operation of the common electrode 102 during the touch cycle (touch 1), further improving the touch accuracy of the touch display panel 100.

For illustration, as shown in FIG. 2, between time T0 and T1 the touch display panel 100 is in the display cycle (display 1), while the touch panel synchronization signal TSYNC has a high voltage and the timing control signal TCON indicates that the touch display panel 100 is operating in the display cycle. The source control circuit 132 outputs the source driving signal VS having a display data voltage Data1, causing the source terminal Ts to rise to the display data voltage Data1.

Then, between time T1 and time T2, the touch display panel 100 switches from the display cycle (display 1) to the transition interval (transition 1) in response to the touch panel synchronization signal TSYNC. In some embodiments, the source driver circuit 1321 pulls down the source terminal Ts to a voltage V_VB1 less than the displayed data voltage Data1 by adjusting the voltage of the source driving signal VS. In addition, the voltage drop of the source terminal Ts is coupled to common electrode 102, so that the voltage of common electrode 102 is adjusted, as shown by the downward surge in FIG. 2. The common voltage VCOM then charges the common electrode 102 so that it is pulled from the voltage Vcom_d to the voltage Vcom_s.

The touch display panel 100 then switches from the transition interval (transition 1) to the touch sensing cycle (touch 1) from time T2 to time T3. In some embodiments, the source terminal Ts remains the voltage V_VB1. In other embodiments, the source driver circuit 1321 pulls up the source terminal Ts to the voltage Vpre_s for the touch sensing operation by adjusting the voltage of the source driving signal VS, the voltage V_VB1a being between the display data voltage Data1a and the voltage Vpre_s.

In some embodiments, the control circuit 110 adjusts the source control circuit 132 (i.e., the source driver circuit 1321) to operate in different drive modes according to the required voltage for the source terminal Ts in different operating intervals. For example, in the display cycle (display 1), the source control circuit 132 is in drive mode 2 to rapidly pull up the voltage of the source terminal Ts to the voltage Data1. In the transition interval (transition 1), the source control circuit 132 operates in drive mode 0 to reduce the impact to the source terminal Ts. In addition, by adjusting the drive mode of the source control circuit 132 to have different drive power in different operating cycles, the power consumption in operating cycles that does not require a large drive capacity is reduced, and in some embodiments the voltage slew rate of the source control circuit 132 accelerates, improving the performance of the touch display panel 100.

Figure 3:
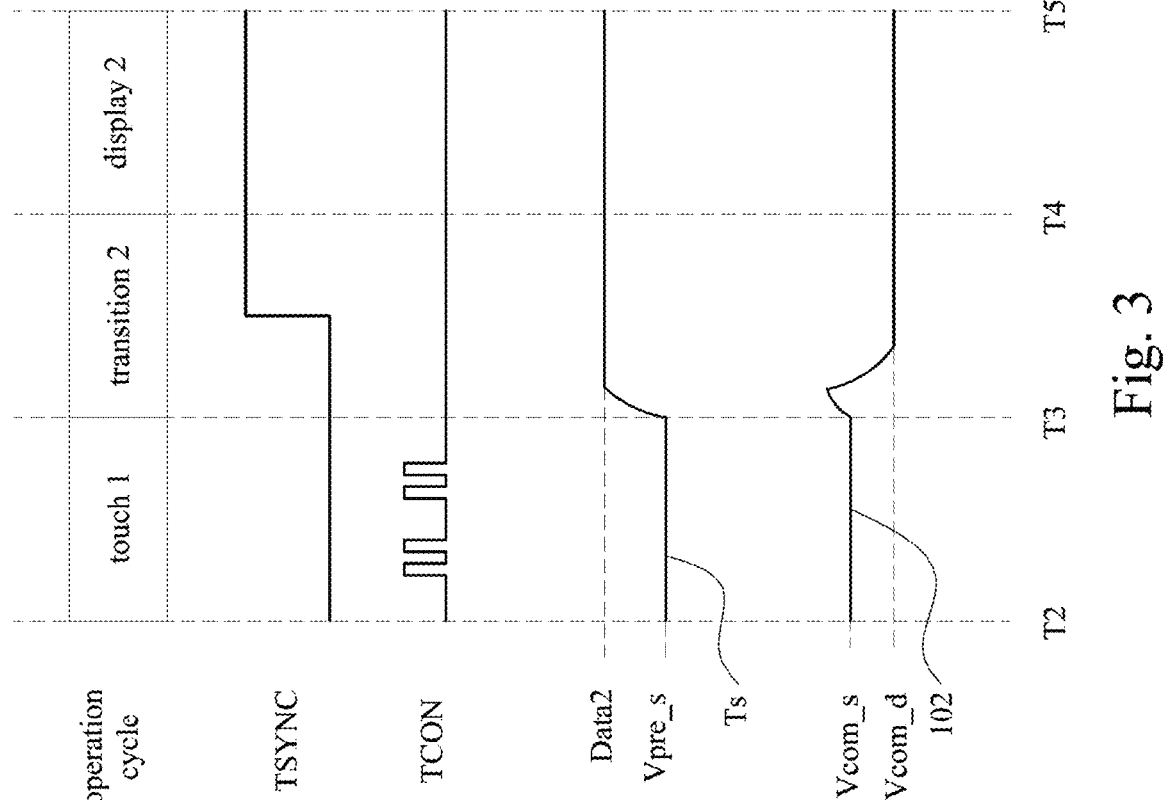
FIG. 3 illustrates the waveforms of the voltage changes of the signals and terminals of the touch display device in FIG. 1 from the touch sensing cycle (touch 1) to the display cycle (display 2), in accordance with some embodiments of the present disclosure.

Reference is now made to FIG. 3. FIG. 3 follows the embodiments in FIG. 2 and illustrates the waveforms of the voltage changes of the signals and terminals of the touch display device 10 in FIG. 1 from the touch sensing cycle (touch 1) to the display cycle (display 2).

It is the same as the embodiment in FIG. 2, in which the voltage of the source terminal Ts is adjusted during the transition interval (transition 1), that the surge appears earlier without affecting the next operation cycle. In the embodiment of FIG. 3, the source driver circuit 1321 outputs the display data voltage Data2a required in the display cycle (display 2) to the source terminal Ts during the transition interval (transition 2) between the touch sensing cycle (touch 1) and the display cycle (display 2), so that surge on the common electrode 102 appears in the transition interval (transition 2) without affecting the operation of the display cycle (display 2). This reduces the influence induced by the coupling effect to the common electrode 102 of the touch display panel 100, providing the common electrode 102 sufficient time to reach the voltage required for the display cycle (display 2) and thus further enhancing the accuracy of the display operation.

For illustration, between time T3 and T4, the touch display panel 100 switches from the touch sensing cycle (touch 1) to the transition interval (transition 2), and the touch panel synchronization signal TSYNC changes so that the touch display panel 100 enters the display cycle (display 2) at time T4.

At time T3 and before the touch panel synchronization signal TSYNC switches, the source driver circuit 1321 pulls up the source terminal Ts to the display data voltage Data2 a greater than the voltage V_VB1 by adjusting the voltage rise of the source driving signal VS. In addition, the voltage rise of the source terminal Ts is coupled to common electrode 102, so that an upward surge appears on common electrode 102 as shown in FIG. 3. Then, the common voltage VCOM discharges the common electrode 102 to drop it from the voltage Vcom_s to the voltage Vcom_d.

In some embodiments, the display data voltage Data2 is different from the display data voltage Data1. In some embodiments, the display data voltage Data2 is greater than the display data voltage Data1. In some embodiments, the source control circuit 132 switches to drive mode 3 in response to the control signal 1114 to have a greater drive power than that in drive mode 2 to accelerate the voltage rise of the source terminal Ts. After the source terminal Ts reaches the display data voltage Data2, the source control circuit 132 switches to drive mode 2 for a subsequent display cycle (display 2) to reduce the power consumption of the source control circuit 132.

In some embodiments, the control circuit 110 is also configured to generate control signals based on the display data voltage and the load condition of the touch display panel 100 to adjust the drive mode of the source control circuit 132 in the transition intervals and the voltage of the source driving signal VS. This makes the effects of the coupling-induced surges on the common electrode in each transition region consistent, and further improves the quality of the touch display device 10.

In some embodiments, the control circuit 110 is also configured to control the gate control circuit 131, so that the voltage of the gate terminal Tg of the control transistor TFT in the transition interval retains, such as, in a high impedance state, preventing the erroneous illumination of the pixel 101.

Figure 4:
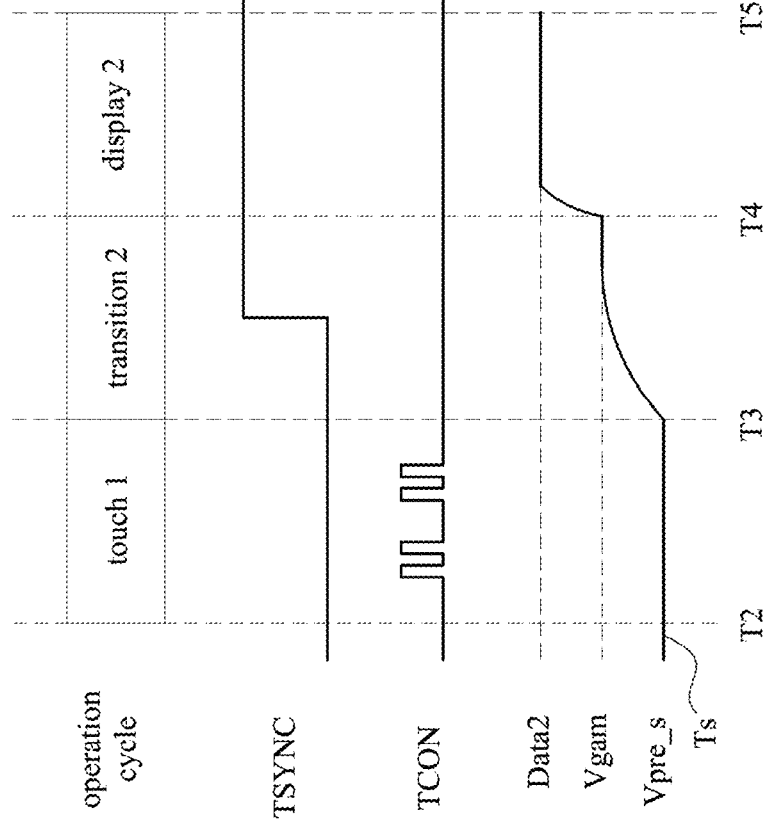
FIG. 4 illustrates waveform diagrams of the voltage change of signals and terminals of the touch display device in FIG. 1 from the touch sensing cycle (touch 1) to the display cycle (display 2), in accordance with some embodiments of the present disclosure.

Reference is now made to FIG. 4. FIG. 4 illustrates waveform diagrams of the voltage change of signals and terminals of the touch display device 10 in FIG. 1 from the touch sensing cycle (touch 1) to the display cycle (display 2), in accordance with some embodiments of the present disclosure. In some embodiments, the control circuit 110 determines the voltage of the source driving output to the source drive line based on the display data voltage in the display cycle after the touch sensing cycle and the drive mode of other source driver circuits in the group same as a certain source drive line. Furthermore, compared to the embodiment in FIG. 3, in the embodiment of FIG. 4 the voltage of the source terminal Ts is directly pulled up in the transition interval (transition 2) to the gamma reference voltage Vgam through the source driving signal VS (for example, the source driving signal VS is directly coupled to the node of the voltage generation circuit 120 that provides the gamma reference voltage Vgam), accordingly reducing the electromagnetic interference and noise between the signals.

For illustration, referring to FIG. 4, at time T3 and before the touch panel synchronization signal TSYNC changing mode, the source control circuit 132 controls, in response to the control signal 1114, the source driver circuit 1321 to pull up, through the source driving signal VS, the source terminal Ts from the voltage Vpre_s to the gamma reference voltage Vgam greater than the voltage Vpre_s. The gamma reference voltage Vgam is similar to the gamma reference voltage GVDD in FIG. 1.

Then, at time T4, when the touch display panel 100 switches from the transition interval (transition 2) to the display cycle (display 2), the source control circuit 132 adjusts, in response to the control signal 1114, the source driving signal VS to change from the gamma reference voltage Vgam to the display data voltage Data2 greater than the gamma reference voltage Vgam.

In addition, the source control circuit 132 switches, in response to the control signal 1114, to drive mode 0 during the transition interval (transition 2) and switches to drive mode 2 with greater drive power during the display cycle (display 2). This can achieve the effect of power saving in the transition interval (transition 2).

Figure 5:
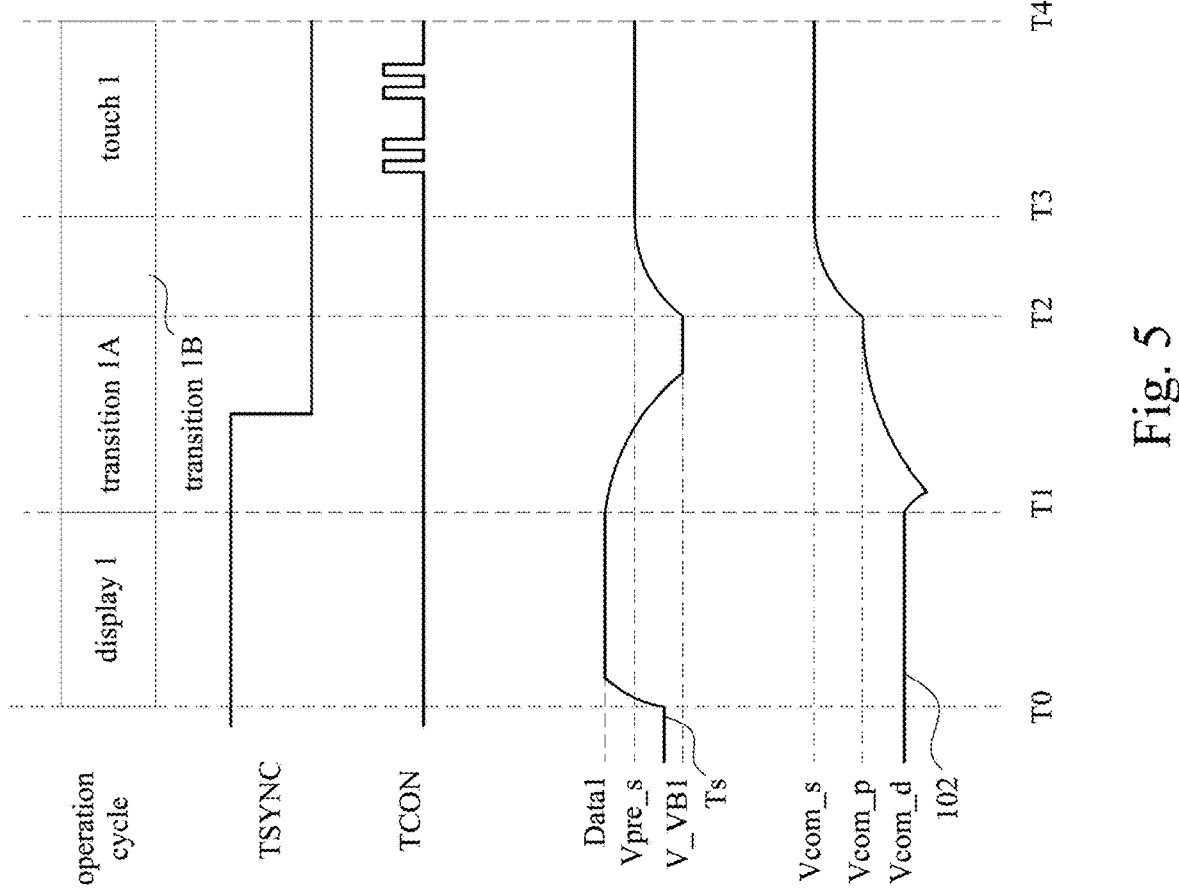
FIG. 5 illustrates waveform diagrams of the voltage change of signals and terminals of the touch display device in FIG. 1 from the display cycle (display 1) to the touch sensing cycle (touch 1), in accordance with some embodiments of the present disclosure.
Figure 6:
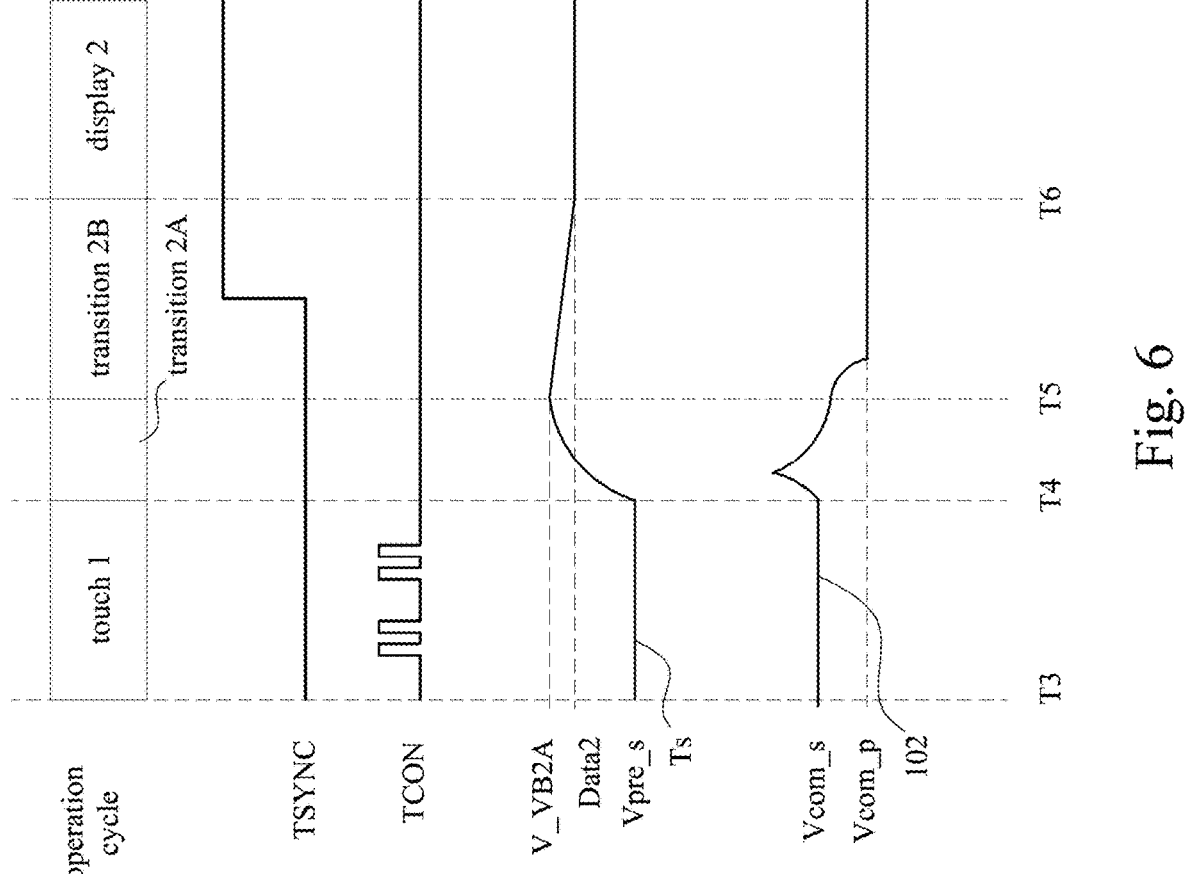
FIG. 6 illustrates the waveforms of the voltage changes of the signals and terminals of the touch display device in FIG. 1 from the touch sensing cycle (touch 1) to the display cycle (display 2), in accordance with some embodiments of the present disclosure.

In some embodiments, the transition interval may include multiple sub-intervals. As shown in FIG. 5, there are two sub-intervals—transition 1A and transition 1B—between the display cycle (display 1) and the touch sensing cycle (touch 1). As shown in FIG. 6, there are two sub-intervals—transition 2A and transition 2B—between the touch sensing cycle (touch 1) and the display cycle (display 2). The control circuit 110 is also configured to control the voltage of the source driving signal VS and the drive mode of the source control circuit 132 in each sub-interval according to the display data voltage of the display cycle (display 1) and the touch sensing cycle (touch 1) and the preset voltage for the touch sensing cycle, in order to further control the voltage of source terminal Ts and the voltage of the common electrode 102. In other words, by adjusting the voltage of the source terminal Ts in the transition interval and by coupling the source terminal Ts with the common electrode 102, the common electrode 102 reaching the voltage required during the touch sensing cycle accelerates. This improves the operation speed of the touch display panel 100.

Reference is now made to FIG. 5. FIG. 5 illustrates waveform diagrams of the voltage change of signals and terminals of the touch display device 10 in FIG. 1 from the display cycle (display 1) to the touch sensing cycle (touch 1), in accordance with some embodiments of the present disclosure. In the embodiment of FIG. 5, in addition to pulling down the voltage of the source terminal Ts in advance in the transition interval (transition 1A) to prevent the surge coupling to common electrode 102, the pulling up the source terminal Ts to the voltage required in the touch sensing cycle (touch 1) is accelerated further by adjusting the drive power of the source control circuit 132, promoting the common electrode 102 to rapidly reach its required voltage in the touch sensing cycle (touch 1) due to the coupling effect.

For illustration, between time T1 and time T2, the touch display panel 100 switches, in response to the touch panel synchronization signal TSYNC switching, from the display cycle (display 1) to the sub-interval (transition 1A). The source control circuit 132 pulls down the source terminal Ts to a voltage V_VB1 less than the display data voltage Data1c by adjusting the source driving signal VS. Accordingly, the voltage drop of the source terminal Ts is coupled to the common electrode 102, so that the voltage of common electrode 102 is adjusted, as shown by the downward surge in FIG. 5. Next, the common electrode 102 is charged to the voltage Vcom_p through the common voltage VCOM.

Then, between time T2 and time T3, the touch display panel 100 switches from the sub-interval (transition 1A) to the sub-interval (transition 1B). The source control circuit 132 switches, in response to the control signal 1114, from the drive mode 2 to the drive mode 4 to increase the drive power, and then further increases the source terminal Ts to the voltage Vpre_s greater than the voltage V_VB1 by accelerating the voltage rise of the source driving signal VS. Due to the rise in voltage of the source Ts that couples to the common electrode 102, charging the common electrode 102 to the voltage Vcom_s by the common voltage VCOM is sped up. In some embodiments, the voltage Vcom_s is greater than the voltage Vcom_p.

In some embodiments, the length of the sub-interval (transition 1A) differs from that of the sub-interval (transition 1B). For example, when the voltage Vpre_s is higher, for example, significantly greater than the voltage V_VB1, the length of the sub-interval (transition 1B) is longer than that of the sub-interval (transition 1A).

Reference is now made to FIG. 6. FIG. 6 follows the embodiments in FIG. 5 and illustrates the waveforms of the voltage changes of the signals and terminals of the touch display device 10 in FIG. 1 from the touch sensing cycle (touch 1) to the display cycle (display 2).

It is same as the embodiment in FIG. 5, in which the voltage of the source terminal Ts is adjusted during the transition interval (transition 1), that the surge appears earlier without affecting the next operating cycle. In the embodiment of FIG. 6, since the source terminal Ts has a display data voltage Data2 that is greater than the display data voltage Data1 in the display cycle (display 2), the source driver circuit 1321 pulls up the source terminal Ts to a voltage V_VB2A that is greater than the voltage Vpre_s in the transition interval (transition 2A). Accordingly, the upsurge on the common electrode 102 occurs in the transition interval (transition 2A) without affecting the operation of the display cycle (display 2). This reduces the coupling effect of the common electrode 102 of the touch display panel 100, thus further improving the accuracy of the display operation.

Then, between time T5 and time T6, the touch display panel 100 switches from a sub-interval (transition 2A) to a sub-interval (transition 2B). At time T5 and before the touch panel synchronization signal TSYNC switches, the source control circuit 132 adjusts the source driving signal VS to make the source terminal Ts have the display data voltage Data2. Accordingly, the voltage drop in the source terminal Ts is coupled to the common electrode 102, so that the voltage of common electrode 102 is adjusted, as shown in the downward surge in FIG. 4. The common electrode 102 is discharged to the voltage Vcom_d through the common voltage VCOM.

In some embodiments, the source control circuit 132 is in different drive modes in different transition intervals (transition 2A and transition 2B) and in the display cycle (display 2). For example, the source control circuit 132 is in the drive mode 0 in the transition interval (transition 2A), reducing the coupling effect of the source terminal Ts to the common electrode 102. The source control circuit 132 is in the drive mode 4 in the transition interval (transition 2B), and the common electrode 102 reaching the desired voltage Vcom_d is sped up by the coupling effect. Through the aforementioned configurations, the speed for the terminals in the touch display device 10 to reach the required voltage is increased.

In some embodiments, as in the control methods illustrated in FIG. 7 to FIG. 10, the control circuit 110 controls the gate control circuit 131 through the control signal 1113 to adjust the voltage of the gate driving signal VG in the transition interval, further assisting the common electrode 102 to be charged to the voltage required for the touch sensing cycle.

Figure 7:
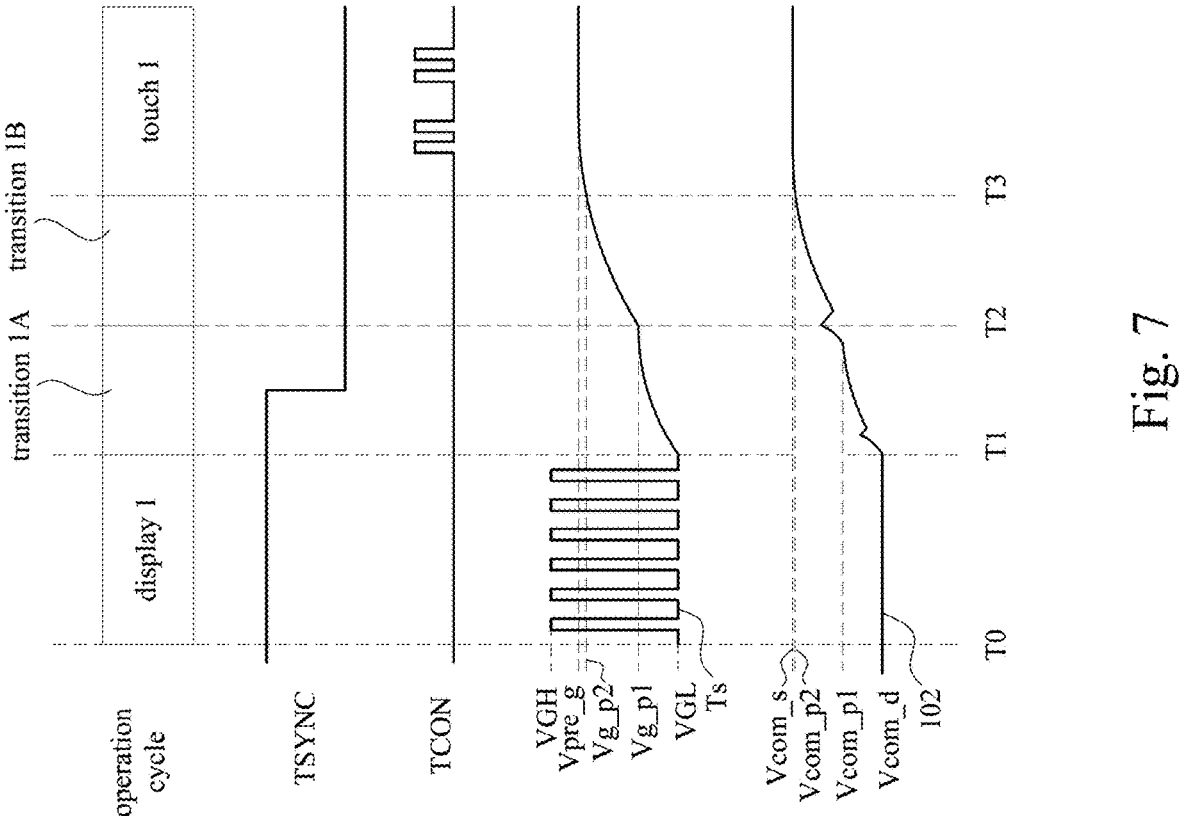
FIG. 7 illustrates the waveforms of the voltage changes of the signals and terminals of the touch display device in FIG. 1 from the display cycle (display 1) to the touch sensing cycle (touch 1), in accordance with some embodiments of the present disclosure.

Reference is now made to FIG. 7. FIG. 7 illustrates the waveforms of the voltage changes of the signals and terminals of the touch display device 10 in FIG. 1 from the display cycle (display 1) to the touch sensing cycle (touch 1), in accordance with some embodiments of the present disclosure. In the embodiment of FIG. 7, the control circuit 110 divides the transition interval into multiple sub-intervals through the timing control signal TCON and the register 133 in the gate control circuit 131, for example, two sub-intervals—the transition 1A and the transition 1B—between the display cycle (display 1) and the touch sensing cycle (touch 1). The gate driving signal VG in different sub-intervals is set to have different voltages to adjust the voltage of the gate terminal Tg.

In the embodiment of FIG. 7, by adjusting the voltage of the gate terminal Tg in the transition interval and by coupling the gate terminal Tg with the common electrode 102, the common electrode 102 reaching the voltage required during the touch sensing cycle is accelerated. Compared with some drive methods, the present application can provide the common electrode 102 reaching the required voltage in about 60% of the time. This not only improves the operating speed of the touch display panel 100, but also reduces the power consumption of driving the common electrode 102 by the sensing driver circuit 1411.

For illustration, at time between T0 and T1 the touch display panel 100 is in the display cycle (display 1) in response to the touch panel synchronization signal TSYNCd having a high voltage. The gate control circuit 131 outputs, in response to the control signal 1113, the gate driving signal VG having pulses of a gate turn-on voltage VGH and a gate turn-off voltage VGL to the gate terminal Tg of the control transistor TFT. The common voltage VCOM transmitted to the common electrode 102 has the common voltage Vcom_d.

Between time T1 and time T2 the touch display panel 100 switches from the display cycle (display 1) to the sub-interval (transition 1A). Specifically, the gate control circuit 131 adjusts the gate driving signal VG in response to the control signal 1113, so that the gate terminal Tg rises to the voltage Vg_p1. Correspondingly, the voltage rise of the gate terminal Tg is coupled to the common electrode 102, so that the voltage of the common electrode 102 is adjusted, as shown by the upward surge in FIG. 7. The common electrode 102 is charged to the voltage Vcom_p1 through the common voltage VCOM.

Then, between time T2 and time T3 the touch display panel 100 switches from the sub-interval (transition 1A) to the sub-interval (transition 1B). The gate control circuit 131 continuously adjusts the gate driving signal VG in response to the control signal 1113, so that the gate terminal Tg is pulled up to the voltage Vg_p2. Correspondingly, the voltage rise of the gate terminal Tg is coupled to the common electrode 102, so that the voltage of the common electrode 102 is adjusted, as shown by the upward surge in FIG. 7. The common electrode 102 is charged to the voltage Vcom_p2 through the common voltage VCOM.

At time T3, the touch display panel 100 enters the touch sensing cycle (touch 1), and the common voltage VCOM has the voltage Vcom_s. By aforementioned approach of coupling the voltage at the gate terminal Tg to the common electrode 102, additional driving thrust is provided to accelerate the common electrode 102 reaching the desired voltage.

Figure 8:
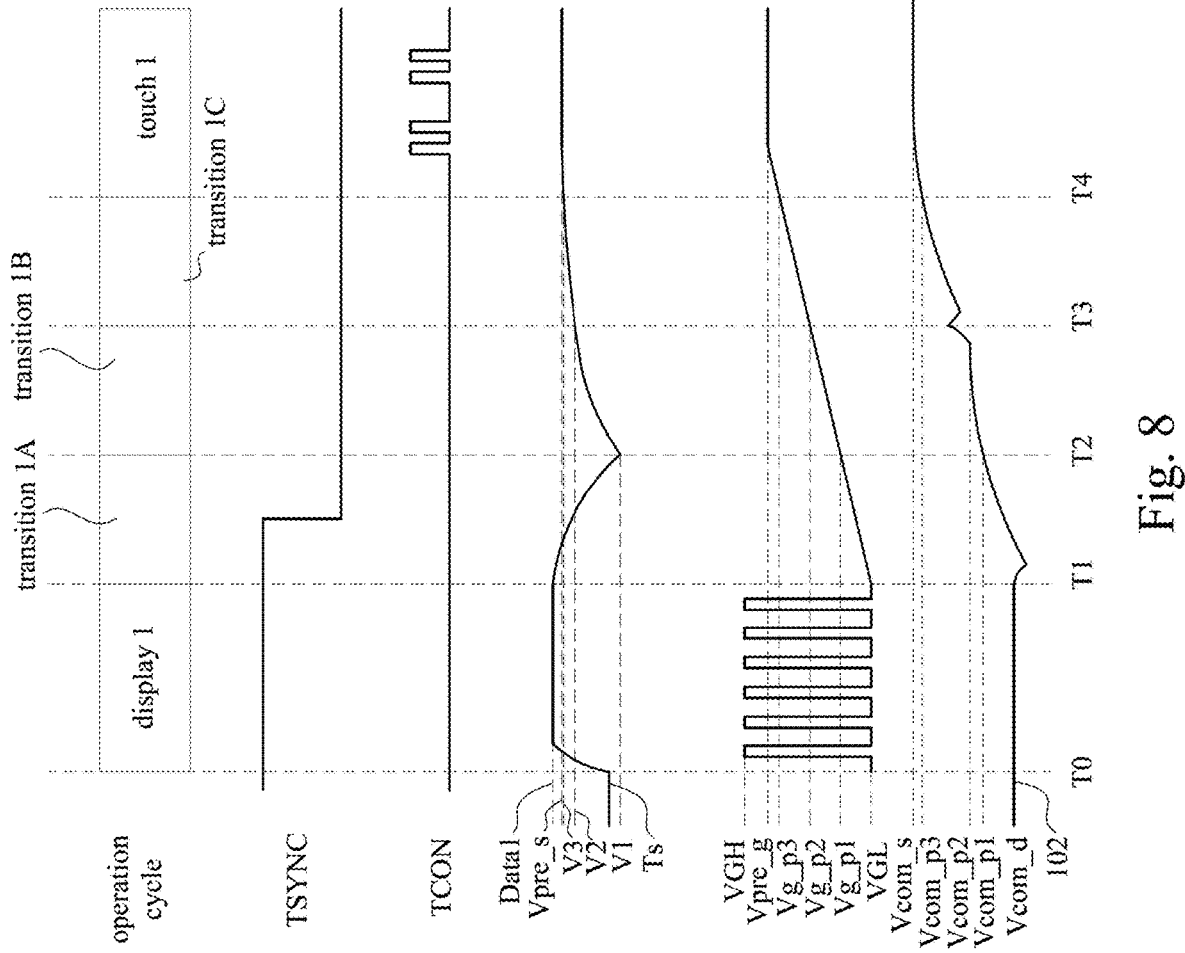
FIG. 8 illustrates the waveforms of the voltage changes of the signals and terminals of the touch display device in FIG. 1 from the display cycle (display 1) to the touch sensing cycle (touch 1), in accordance with some embodiments of the present disclosure.
Figure 9:
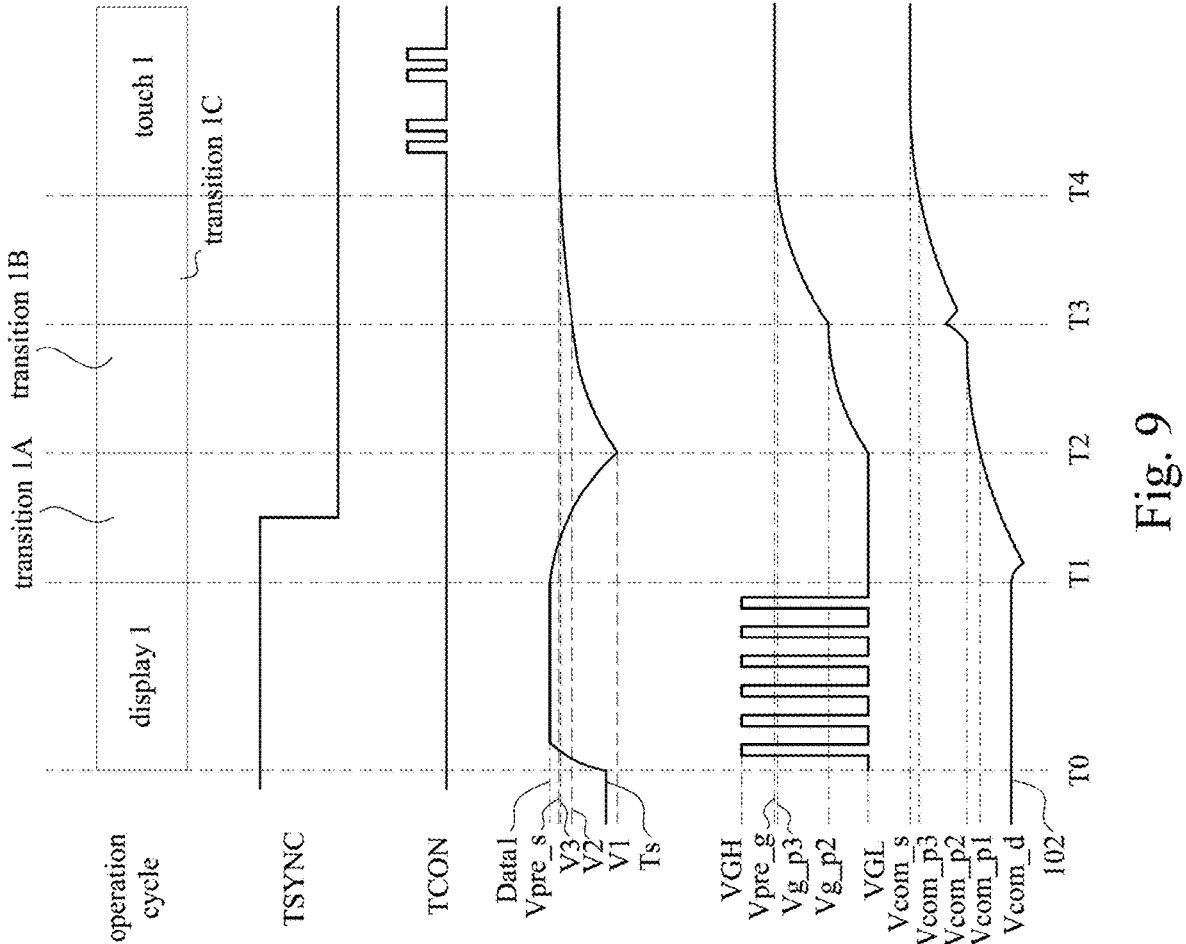
FIG. 9 illustrates the waveforms of the voltage changes of the signals and terminals of the touch display device in FIG. 1 from the display cycle (display 1) to the touch sensing cycle (touch 1), in accordance with some embodiments of the present disclosure.
Figure 10:
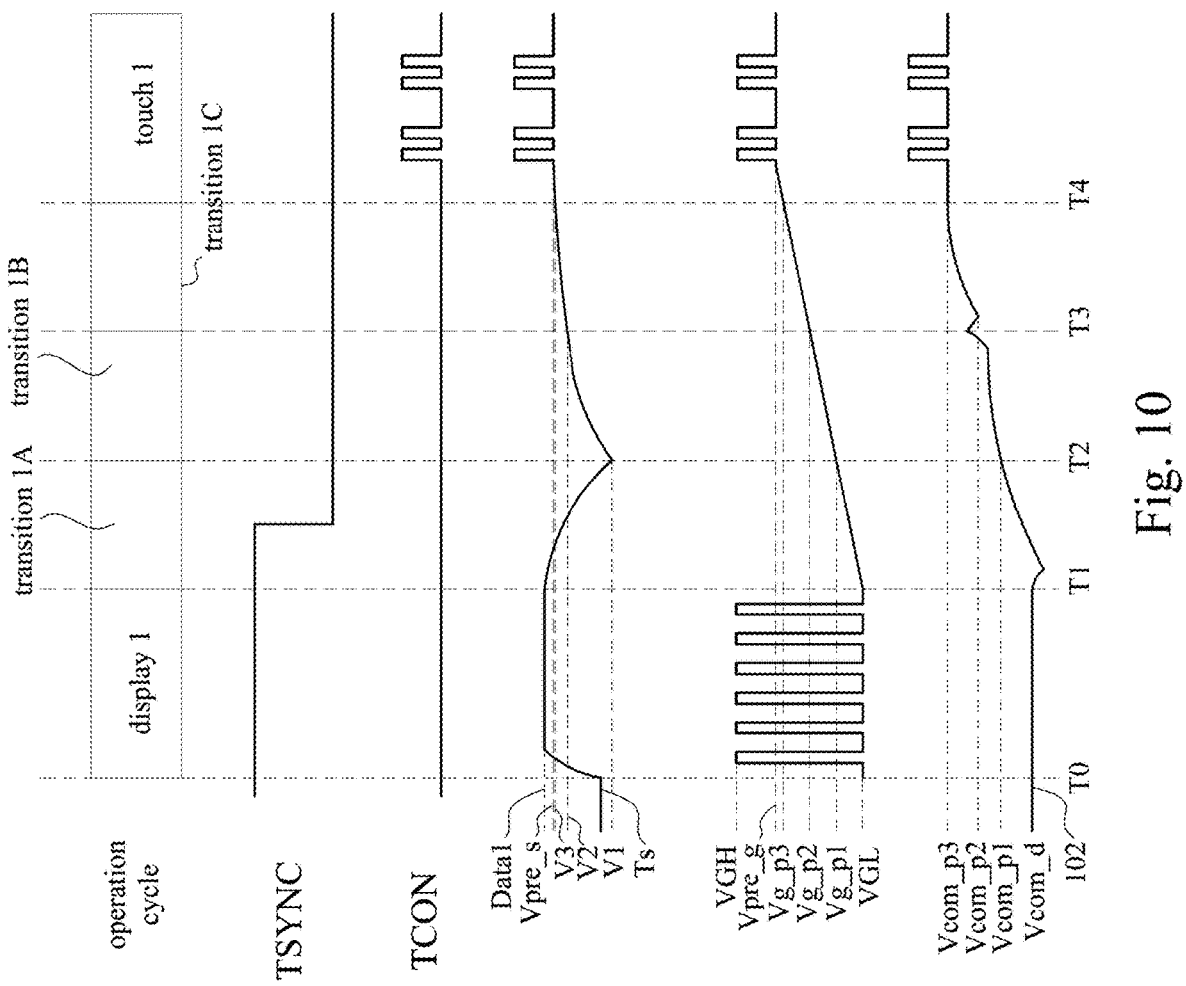
FIG. 10 illustrates the waveforms of the voltage changes of the signals and terminals of the touch display device in FIG. 1 from the display cycle (display 1) to the touch sensing cycle (touch 1), in accordance with some embodiments of the present disclosure.

In the embodiment of FIG. 8 to FIG. 10, the control circuit 110 controls both the gate control circuit 131 and the source control circuit 132 through the control signals 1113 and 1114 to adjust the voltage of the gate driving signal VG and the source driving signal VS in the transition interval at the same time, in which the cooperation accelerates the common electrode 102 being charged to the voltage required for the touch sensing cycle and reduces the effects of electromagnetic interference induced by instantaneous voltage and current changing while the switching operation cycle.

Reference is now made to FIG. 8. FIG. 8 illustrates the waveforms of the voltage changes of the signals and terminals of the touch display device 10 in FIG. 1 from the display cycle (display 1) to the touch sensing cycle (touch 1), in accordance with some embodiments of the present disclosure. In the embodiment of FIG. 8, the transition interval includes three sub-intervals, namely, a transition 1A, a transition 1B, and a transition 1C.

The configurations of the touch display panel 100 in the display cycle (display 1) and the sub-interval (transition 1A) in FIG. 8 is similar to that in FIG. 5 and FIG. 7. Therefore, repetitious descriptions are omitted here.

Then, between time T2 and time T4 the touch display panel 100 switches from the sub-interval (transition 1A) to the sub-interval (transition 1B) and the sub-interval (transition state 1C) in sequence. The source control circuit 132 adjusts the voltage of the source driving signal VS, so that the source terminal Ts rises to the voltages V2 and V3 in sequence. The gate control circuit 131 adjusts the voltage of the gate driving signal VG, so that the gate terminal Tg rises to the voltage Vg_p3.

In response to the voltage rise of the source terminal Ts and the gate terminal Tg, the common electrode 102 being charged through the common voltage VCOM to reach the voltage Vcom_s when the touch display panel 100 switches into the touch sensing cycle (touch 1) is sped up.

Reference is now made to FIG. 9. FIG. 9 illustrates the waveforms of the voltage changes of the signals and terminals of the touch display device 10 in FIG. 1 from the display cycle (display 1) to the touch sensing cycle (touch 1), in accordance with some embodiments of the present disclosure.

The configurations of FIG. 9 are similar to that in FIG. 8. Compared to the embodiment in FIG. 8, instead of the voltage of the gate terminal Tg rising in the sub-interval (transition 1A), the gate terminal Tg is in a high impedance state in the sub-interval (transition 1A) in the embodiment shown in FIG. 9. Then, the gate terminal Tg is charged to voltages Vg_p2 and Vg_p3 in the subsequent sub-intervals (transition 1B and transition 1C) in sequence and reaches the voltage Vpre_g until the touch display panel 100 switches into the touch sensing cycle (touch 1).

The configurations of FIG. 7 to FIG. 9 are given for illustrative purposes. The various embodiments in FIG. 7 to FIG. 9 fall within the complementary scope of embodiments of the present case. For example, in some embodiments, there are more than three sub-intervals between the display cycle and the touch sensing cycle for transition. In other embodiments, the voltage of the gate driving may rise in the sub-interval (transition 1A) and reach the voltage Vpre-g in the sub-intervals (transition 1B and transition 1C), further preventing the surge to operations while entering the touch sensing cycle (touch 1).

According to some embodiments of this disclosure, the source driving signal and gate driving signal in the embodiments of FIG. 2 to FIG. 9 may include pulses in the touch driving applied to the common electrode during the touch sensing cycle to suppress the influence of parasitic capacitors in the touch display panel on the touch sensing operation, as shown in FIG. 10.

According to some embodiments of this disclosure, the control circuit 110 is also configured to control the drive mode of the sensing driver circuit in the touch sensing control circuit 140 to provide different drive power in different operating cycles. For example, in operating cycles with low drive requirements, drive modes with lower drive power can be selected to reduce voltage conversion rates or variable voltage differences, thereby reducing power consumption, electromagnetic interference, and noise coupling.

This disclosure provides a touch display device. The touch display device utilizes the driving signals to the gate terminal and the source terminal in the control transistor to generate voltage coupling to accelerate the common electrode reaching required voltage. Therefore, the preparation time and recovery time of the common electrode are shortened. In addition, since the common electrode is not only driven by the common electrode driver circuit, the power consumption for driving the common electrode can be reduced by adjusting the driving signals of the gate terminal and the source terminal and the drive mode of the source control circuit to provide different drive power in different operating cycles. In some embodiments, the timing control makes the surge induced by the change of gate and source voltage occur in the transition interval between the display and touch operation cycle, preventing the surge affecting the operations of the touch display panel during the display and touch operation cycle and further improving the display and touch quality of the touch display panel.

Although the present invention has been described in considerable detail with reference to certain embodiments thereof, other embodiments are possible. Therefore, the spirit and scope of the appended claims should not be limited to the description of the embodiments included herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch display device, comprising:
    a touch display panel comprising a control transistor that is coupled to a common electrode through a liquid crystal capacitor; and
    a driver circuit, coupled with the touch display panel, to output a first driving signal to a first terminal of the control transistor,
    when the touch display panel switches from a first operating cycle to a first transition interval, the driver circuit adjusts the first driving signal to change a voltage of the first terminal of the control transistor from a first voltage to a second voltage smaller than the first voltage to adjust a voltage of the common electrode, wherein the first operating cycle is display cycle,
    wherein the driver circuit further adjusts a voltage of the first driving signal before a touch panel synchronization signal changes.

2. The touch display device of claim 1, wherein the first driving signal is a source driving signal and the first terminal of the control transistor is a source terminal,
    wherein the driver circuit comprises:
        a source control circuit to output the source driving signal, and to adjust the source driving to change the voltage of the source terminal from the second voltage to a third voltage when the touch display panel switches from a second operating cycle to a second transition interval, wherein the second operating cycle is after the first transition interval.

3. The touch display device of claim 2, wherein a drive power of the source control circuit in the first operating cycle is greater than the drive power in the first transition interval.

4. The touch display device of claim 2, wherein the third voltage has a gamma reference voltage, wherein the source control circuit further adjusts the source driving signal to change the voltage of the source terminal from the third voltage to a fourth voltage higher than the gamma reference voltage when the touch display panel switches from the second transition interval to a third operating cycle, and a drive power of the source control circuit in the second transition interval is less than the drive power in the third operating cycle.

5. The touch display device of claim 2, wherein the first transition interval comprises a first sub-interval and a second sub-interval, wherein the source control circuit further adjusts the source driving signal in the first sub-interval to change the voltage of the source terminal from the first voltage to a fourth voltage less than the first voltage, and in the second sub-interval pulls up the source driving signal to pull up the voltage of the source terminal from the fourth voltage to the second voltage.

6. The touch display device of claim 5, wherein a drive power of the source control circuit in the first sub-interval is less than the drive power in the second sub-interval.

7. The touch display device of claim 5, wherein the second transition interval comprises a third sub-interval and a fourth sub-interval, wherein the source control circuit further pulls up the source driving signal in the third sub-interval to pull up the voltage of the source terminal from the second voltage to the third voltage greater than the second voltage, and in the fourth sub-interval pulls down the source driving signal to pulls down the voltage of the source terminal from the third voltage to a fifth voltage.

8. The touch display device of claim 1, wherein the driver circuit comprises:

a source control circuit to output a source driving signal as the first driving signal and to adjust the source driving signal in a first sub-interval of the first transition interval to change the voltage of the first terminal of the control transistor from the first voltage to a third voltage less than the first voltage, and to adjust the source driving signal in a second sub-interval of the first transition interval to change the voltage of the first terminal of the control transistor from the third voltage to the second voltage greater than the third voltage; and a gate control circuit to output a second driving signal to a second terminal of the control transistor and to pull up the second driving signal to pull up the second terminal of the control transistor to a fourth voltage in the first transition interval.

9. The touch display device of claim 8, wherein the gate control circuit further controls the second terminal of the control transistor to be in a high impedance state in the first sub-interval, pulls up the second driving signal in the second sub-interval to pull up the voltage of the second terminal of the control transistor to a fifth voltage less than the fourth voltage, and pulls up the second driving signal to pull up the voltage of the second terminal to the fourth voltage in a third sub-interval, after the second sub-interval, of the first transition interval.

10. The touch display device of claim 1, wherein a drive power of the driver circuit in the first operating cycle is greater than the drive power in the first transition interval.

11. The touch display device of claim 1, wherein the driver circuit further switches from a first drive mode to a second drive mode different from the first drive mode before the touch panel synchronization signal changes.

12. A driver circuit for driving a touch display panel, comprising:

a control circuit to generate a control signal based on a display data voltage for a display cycle and a preset voltage for a touch sensing cycle; and a first driver circuit coupled to the control circuit and to output, in response to the control signal, a first driving signal, wherein in a first transition interval from the display cycle to the touch sensing cycle the first driving signal has a voltage decreasing to a first voltage from a second voltage, wherein the first voltage is different from the second voltage of the first driving signal in the display cycle, wherein the driver circuit further adjusts the voltage of the first driving signal before a touch panel synchronization signal changes.

13. The driver circuit of claim 12, wherein the first driver circuit further pulls up, in response to the control signal, the first driving signal from the first voltage to the preset voltage in a second transition interval between the display cycle and the touch sensing cycle, wherein the second transition interval is after the first transition interval.

14. The driver circuit of claim 13, wherein the first driver circuit comprises a source control circuit to output the first driving signal;

wherein the driver circuit further comprises:

a gate control circuit to pull up a second driving signal to a third voltage in the second transition interval.

15. The driver circuit of claim 12, wherein the first driver circuit further has, in response to the control signal, different drive power in the display cycle, the first transition interval and the touch sensing cycle.

16. The driver circuit of claim 15, wherein a drive power of the first driver circuit in the first transition interval is greater than the drive power in the display cycle.

17. The driver circuit of claim 12, wherein the preset voltage is between the display data voltage and the first voltage.

* * * * *